(12) United States Patent
Davis

(10) Patent No.: US 8,840,119 B2
(45) Date of Patent: Sep. 23, 2014

(54) MODULAR DYNAMICALLY ADJUSTABLE SUSPENSION SYSTEM FOR TRAILERS

(76) Inventor: F. Brent Davis, Macon, GA (US)

(*) Notice: Subject to any disclaimer, the term of this patent is extended or adjusted under 35 U.S.C. 154(b) by 31 days.

(21) Appl. No.: 13/493,952

(22) Filed: Jun. 11, 2012

(65) Prior Publication Data

US 2013/0328278 A1    Dec. 12, 2013

(51) Int. Cl.
*B60P 1/00* (2006.01)
(52) U.S. Cl.
USPC .................................................. 280/6.157
(58) Field of Classification Search
USPC ............. 280/6.151, 6.157, 6.16, 656, 789,
280/124.116, 124.151, 124.157; 414/482
See application file for complete search history.

(56) References Cited

U.S. PATENT DOCUMENTS

| | | | | |
|---|---|---|---|---|
| 4,077,642 A * | 3/1978 | Clark | | 280/43.2 |
| 4,580,798 A * | 4/1986 | Roelofs | | 280/5.508 |
| 4,934,733 A * | 6/1990 | Smith et al. | | 280/124.132 |
| 5,090,495 A * | 2/1992 | Christenson | | 180/24.02 |
| 5,161,814 A * | 11/1992 | Walker | | 280/414.5 |
| 5,275,430 A * | 1/1994 | Smith | | 280/6.151 |
| 5,887,880 A * | 3/1999 | Mullican et al. | | 280/43.18 |
| 6,098,995 A * | 8/2000 | Danis | | 280/6.152 |
| 6,340,165 B1 * | 1/2002 | Kelderman | | 280/124.153 |
| 6,382,647 B1 * | 5/2002 | Smith | | 280/93.512 |
| 6,857,643 B2 * | 2/2005 | Neider | | 280/43.18 |
| 7,360,775 B2 * | 4/2008 | Anderson et al. | | 280/124.128 |
| 7,918,465 B2 * | 4/2011 | Metzger | | 280/6.153 |
| 2002/0113382 A1 * | 8/2002 | Dosdall | | 280/6.151 |

* cited by examiner

*Primary Examiner* — Paul N Dickson
*Assistant Examiner* — Robert A Coker

(57) ABSTRACT

Embodiments disclosed herein provide a modular apparatus and system for automatically raising and lowering the deck height of a towed trailer. The embodiment is comprised of a trailer frame to which a drop axle is attached via a dynamic height adjustable means, such as electrically operated air springs. The drop axle may have two or more wheels mounted to opposite ends of the drop axle and attached to the trailer frame via the dynamic height adjustable means. Thus allowing the dynamic height adjustable means to raise and lower the trailer frame above and below the centerline of the wheels, which aids loading and unloading of cargo onto the trailer.

18 Claims, 4 Drawing Sheets

MODULAR DYNAMICALLY ADJUSTABLE SUSPENSION SYSTEM FOR TRAILERS

TECHNOLOGICAL FIELD

The present invention generally relates to the field of auto parts and vehicle trailer accessories. More particularly, the present invention relates to a modular apparatus and system for the dynamic raising and lowering of a towed vehicle trailer such as a utility trailer, motor-cycle trailer, boat trailer, or soft-tail trailer.

BACKGROUND

A trailer is generally an unpowered vehicle that is attachable to and pulled by a powered vehicle. Commonly, the term trailer refers to unpowered vehicles that are used for transport of goods and materials. The origins lay in utility trailers built in a similar fashion to horse-drawn wagons. Many trailers are made for use with practically any powered vehicle having an appropriate hitch. However, some trailers are part of large trucks called semi-trailer trucks for transportation of cargo. There are also specialized trailers such as open-air motor-cycle trailers, bicycle trailers, boat trailers or small automobile trailers riding on a single set of axles. Other trailers, such as utility trailers and travel trailers or campers come in single and multiple axle varieties, to allow for varying sizes of tow vehicles. There also many specialized trailers for housing, storage, mobile businesses, etc. Nearly all of these trailers share the limitation of the trailer's deck or floor being at or above the axle position of the trailer's wheels.

Having the deck or floor of a trailer at or above the axle position of the trailer's wheels makes it difficult to use the trailer for it's primarily purpose, loading, unloading, and carrying cargo. Many of these utility, motorcycle, boat, etc. trailers are designed to tilt about the axle of their wheels to allow the trailer to be easy hitched to a vehicle and to facilitate loading and unloading of cargo. With the deck level of many of these trailers being above the axle position of the trailer's wheels often the trailers must also include a ramp or ramps to facilitate the loading and unloading of cargo. The weight, height and position of these ramps make it difficult to safely and easily load and unload cargo. Furthermore, the design of these ramps also decreases the fuel efficiency of the towing vehicle.

Ramps are added to the utility or cargo trailer because a gradual incline is needed in order to get the cargo up to the same level as the trailer's deck or floor. If the trailer is used to carry heavy cargo including a vehicle such a motorcycle or small car, the ramp has to be strong enough (i.e. heavy enough) to support the weight of the vehicle. What is need is a lightweight apparatus that reduces the complexity of the trailer design by reducing the weight by eliminating the need for ramps and thereby increasing the powered vehicle's fuel efficiency. What is also needed is a system and apparatus of lowering the deck level of a trailer so that it can be loaded easily.

Thus, in view of the foregoing, there is a need for an apparatus and system that overcome the limitations and drawbacks of the prior art. In particular, there is a need for a system and method that provides a dynamic means of lowering the deck of the trailer below the center line of the axle of the trailers wheels. This would allow the trailer to be loaded or unloaded without the assistance of cargo ramps. Embodiments of the present invention provide such solutions.

SUMMARY

The following is a simplified summary of the invention in order to provide a basic understanding of some of the aspects of the invention. This summary is not intended to identify key or critical elements of the invention or to define the scope of the invention.

In exemplary embodiment, an apparatus and system for automatically raising and lowering the deck height of a trailer is provided. The embodiment is comprised of a trailer frame to which a modular suspension system is attached that comprises a drop axle attached to a dynamic height adjustable suspension system. The drop axle may have two or more wheels mounted at opposite ends of the drop axle and attached to the trailer frame via the dynamic height adjustable suspension system. Thus allowing the dynamic height adjustable suspension system to raise and lower the trailer frame above and below the center line of the wheels, which aids loading and unloading of cargo onto the trailer frame (and/or deck).

In an exemplary embodiment the dynamic height adjustable means comprises air springs coupled to an electrically operable air compressor and an air reservoir tank. The trailer frame is lowered below the center line of the wheels as the air springs collapse when the air compressor pulls air via the compressed air lines from the air springs to the reservoir tank. Likewise, the trailer frame is raised above the centerline of the wheels as the air springs inflate when the air compressor forces air via the compressed air lines from the reservoir tank to the air springs.

In a further exemplary embodiment the dynamic height adjustable means comprises hydraulic springs coupled to an electrically operable hydraulic pump and a hydraulic reservoir tank. The trailer frame is lowered below the center line of the wheels as the hydraulic springs collapse when the hydraulic pump pulls hydraulic fluid via the hydraulic lines from the hydraulic springs to the reservoir tank. Likewise, the trailer frame is raised above the centerline of the wheels as the hydraulic springs inflate when the hydraulic pump forces hydraulic fluid via the hydraulic lines from the reservoir tank to the hydraulic springs.

In another exemplary embodiment the dynamic height adjustable means comprises magnetically adjustable springs coupled to an electrical control system. The magnetically adjustable springs are cable of dynamically damping forces between the surface and the wheels while also allowing the deck of the trailer frame to be raised or lowered to accommodate easy loading and unloading of the trailer.

In an exemplary embodiment the drop axle is further mounted to the trailer frame at each wheel via a trailing arm or a squat bar. One end of the squat bar is mounted to the drop axle at the wheel, and an opposite end of the squat bar is adjustably mounted to trailer frame. The addition of the squat bar provides additional stability and support to the trailer frame.

In a further exemplary embodiment the squat bars are adjustably mounted via shock absorbers to the dynamic height adjustable means.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. Included in the drawing are the following Figures.

DETAILED DESCRIPTION OF ILLUSTRATIVE EMBODIMENTS

The following is a description of several exemplary embodiments of systems and apparatuses for a dynamic height adjustable trailer suspension system. Embodiments disclosed herein describe a system and apparatus for providing a dynamic height adjustable trailer suspension system. The dynamic height adjustable trailer suspension system has the ability to raise and lower the deck of a trailer above or below the centerline (i.e. axis) of the wheels of the trailer to facilitate easier loading and unloading of cargo. The system comprises dynamically adjustable springs, which are attached between frame of a trailer and to a drop axle attached to the wheels. The drop axle allows the deck of the trailer to be lowered several inches below the centerline of the wheels, thereby placing the deck of the trailer closer to the ground. The lowering and raising of the trailer deck is accomplished through the use of height adjustable springs. This lowering of the deck of the trailer facilitates easier loading and unloading of cargo.

Figure 1:
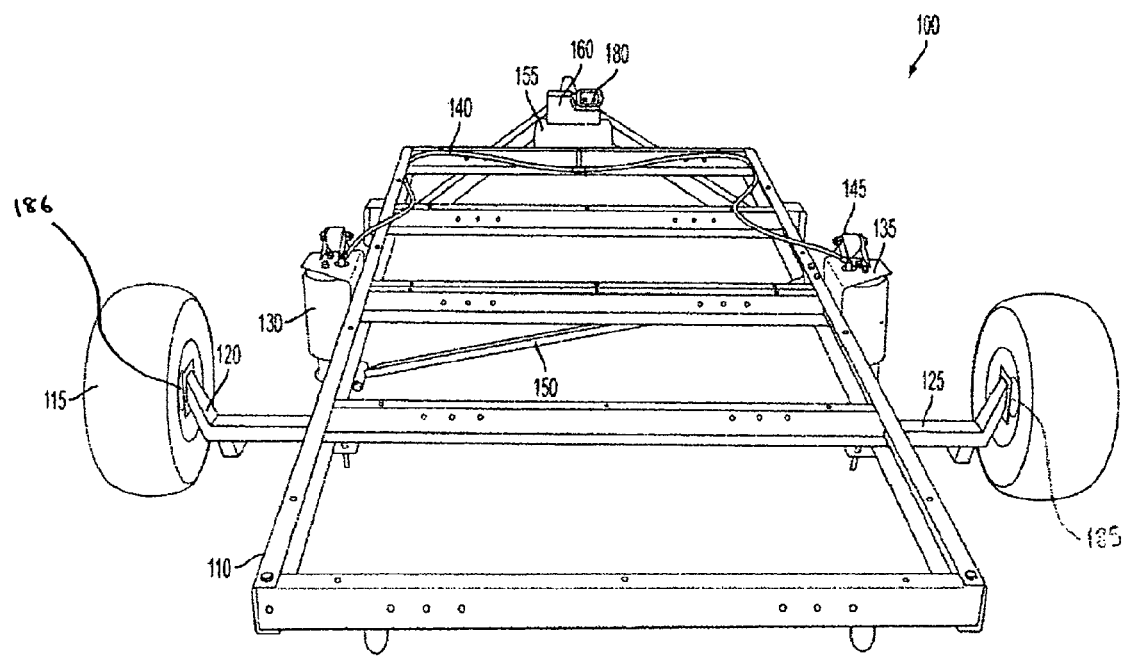
FIG. 1 is an illustration of a perspective of the dynamic height adjustable trailer suspension system according to one embodiment.

FIG. 1 illustrates an exemplary of the dynamically height adjustable trailer suspension system 100. In one embodiment, a standard rectangular utility trailer 110 is used. Attached to either side of the frame of the utility trailer 110 is a pair of spring mounts 135. The spring mounts 135 may be placed in an area of the utility trailer 110 that is usually reserved for wheel attachments. Attached to each of the spring mounts is an adjustable spring 130. In an exemplary embodiment, air springs 130 are used. However, these could just as easily be hydraulic springs or electro-magnetic springs. The air springs 130 are fixedly attached to the spring mounts 135 along their upper portions. Along a lower portion of the air springs 130, a drop axle 125 is adjustably attached. At opposite ends of the drop axle 125 are vertical wheel mounts 120. Attached to the wheel mounts 120 are wheels 115 to facilitate the movement of the utility trailer 110. The vertical wheel mounts 120 include mounting points for the center hubs 185 of the trailer's wheels 115. In an exemplary embodiment, small diameter wheels are used in order to facilitate providing a modular height adjustable suspension system 100 that can place the trailer 110 lower to the ground. Along an upper surface of the utility trailer 110 are supply lines 140. In this embodiment, the supply lines 140 carry compressed air from a compressor 160 and reservoir tank 155 to the air springs 130. The utility trailer 110 frame is lowered below the center line of the wheels 115 as the air springs 130 collapse when the air compressor 160 pulls air via the supply lines 140 from the air springs 130 to the reservoir tank 155. Likewise, the utility trailer 110 frame is raised above the centerline of the wheels 115 as the air springs 130 inflate when the air compressor 160 forces air via the supply lines 140 from the reservoir tank 155 to the air springs 130.

Figure 2:
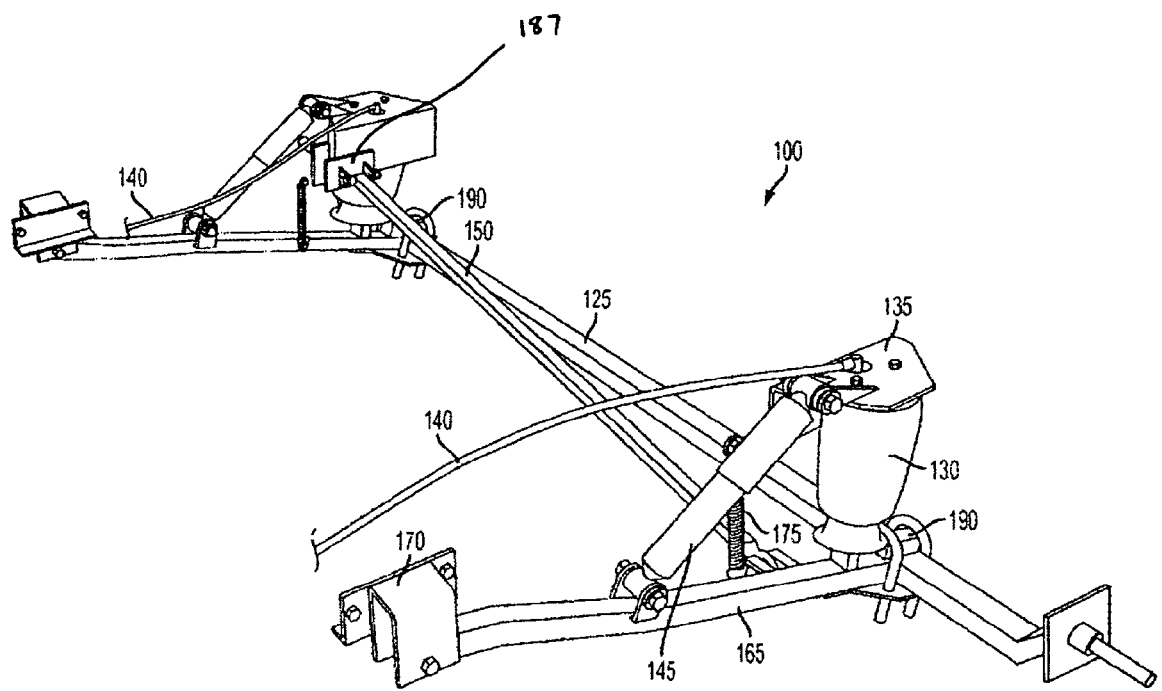
FIG. 2 is an illustration of a perspective of the dynamic height adjustable trailer suspension system squat bar control arm system according to an embodiment.

Referring now to FIG. 2, the components of this modular height adjustable suspension system are illustrated. The combination of these components working together provides a modular height adjustable suspension system for a utility trailer 110 that allows the deck of the utility trailer to be lowered closer to the ground to facilitate easier loading and unloading. The combination of the components of this modular system also provides an air, hydraulic, or magnetic suspension system to a standard utility trailer 110 provides improved damping protection for cargo being carried by the utility trailer 110. According to an embodiment the mechanical portions of the dynamically height adjustable trailer suspension system 100 are comprised of components including wheels 115, vertical wheel mounts 120, drop axle 125, springs 130, spring mounts 135, damping shock absorbers 145, pan-hard bar 150, squat bar 165, squat bar mount 170 and rate/height limiting strap 175. In an exemplary embodiment, spring mounts 135 and squat bar mounts 170 are attached to the frame of the trailer 110. In an exemplary embodiment, air springs 130 are fixedly attached between the spring mounts 135 and the squat bar 165. The squat bar 165 is adjustably attached to the squat bar mount 170 and fixedly attached to the drop axle 125. A rate/height limiting strap 175 is mounted between the trailer frame and the squat bar. The rate/height limiting strap 175 limits the travel of the suspension system 100 relative to the trailer 110. The rate/height-limiting strap 175 further prevents damage to the suspension system 100 by only allowing the suspension system 100 drop a few dew degrees relative to the trailer 110 and it prevents the suspension components from being overextended. The rate/height-limiting strap 175 further prevents tipping of the trailer and its cargo if an obstacle is encountered while backing up the trailer. Similarly the panhard bar 150 is designed to prevent lateral movement of the drop axle 125. In an embodiment, the panhard bar 150 is adjustably attached to the frame of the trailer 110 via an adjustable attachment means 187 and extends across to adjustably attach to a squat bar 165 on the opposite side of the trailer 110. The panhard bar 150 is attached on either end with pivots that permit it to swivel upwards and downwards only, so that the axle is allowed to move in the vertical plane only.

Figure 3:
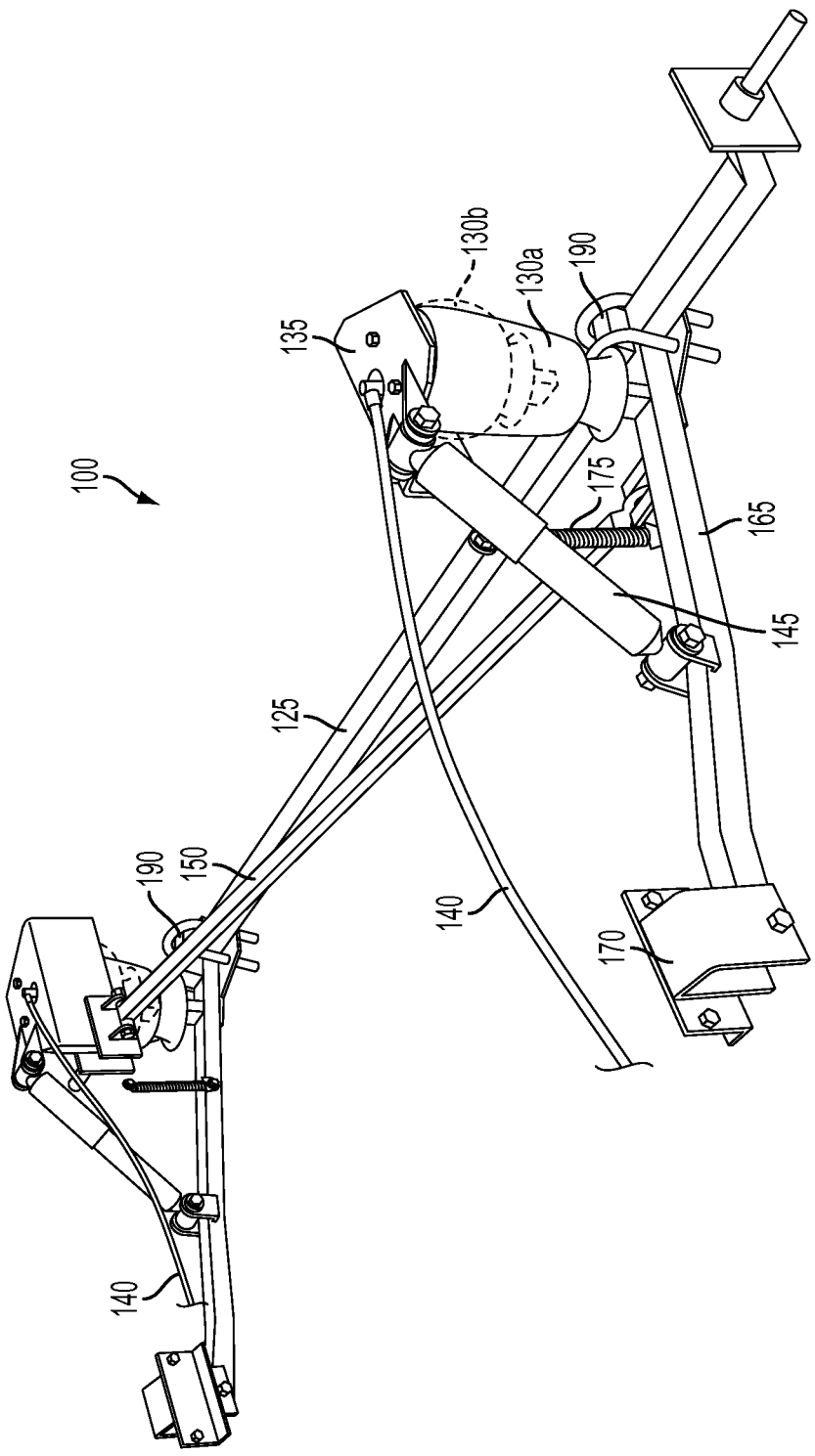
FIG. 3 is an illustration of a perspective of the air springs in raised and lowered positions according to an embodiment.

Further to the embodiment illustrated in FIG. 2; FIG. 3 illustrates the modular adjustable suspension system in operation. For example, air springs 130 are attached to spring mounts 135 and between the deck of the trailer frame 110 at one end and the squat bar 165 at the other end. Attached to the top of the air springs 130 are supply lines 140. These supply lines are attached to an air compressor 160 and an air reservoir tank 155. As the compressor 160 pulls air from the air springs 130 via the supply lines 140, the air springs begin to compress 130b. When the air springs begin to compress 130b, the bottom portion of the air springs 130a, which are attached to the drop axel 125, guide the deck of the trailer 110 closer to the ground. Similarly, when the compressor 160 pumps air from the reservoir tank 155 to fill the air springs 130, the bottom of the air springs 130a forces down upon the drop axel 125, which causes the deck of the trailer 110 to rise. In an exemplary embodiment the compressor 160 is electrically operable. The electrical compressor 160 may be electrically connected to the vehicle towing the trailer. The electrical compressor 160 may also feature its own power supply. In an embodiment, the compressor 160 has a control panel 180, which allows an operator to adjustably adjust the height of the trailer 110.

In another embodiment the air springs 130, supply lines 140, and compressor 160 can be replaced with hydraulic springs 130, supply lines 140 and pump 160. The supply lines are attached to a hydraulic pump 160 and a hydraulic reservoir tank 155. As the pump 160 pulls fluid from the air springs 130 via the supply lines 140 the deck of the trailer 110 is lowered. Similarly, when the pump 160 pulls fluid from the reservoir tank 155 to fill the hydraulic springs 130, the deck of the trailer 110 is raised. In an exemplary embodiment the pump 160 is electrically operable. The electrical pump 160 may be electrically connected to the vehicle towing the trailer. The electrical pump 160 may also feature its own power supply. In an embodiment, the pump 160 has a control panel 180, which allows an operator to adjustably adjust the height of the trailer 110.

In another embodiment the air springs 130, supply lines 140, reservoir tank 155 and compressor 160 can be replaced with magnetic springs 130 and an electrical control panel 180. The control panel 180 is configured to allow the magnetic springs 130 to be height adjusted by the operator. Therefore, in an embodiment, the height of the trailer 110 deck is electrically adjustable.

The suspension system features dampening shock absorbers 145 which aid in ensuring smoother travel for the trailer 110 and deck. In an exemplary embodiment, the dampening shock absorbers are adjustably mounted between the upper air-spring mount 135 and the squat bar 165, thereby aiding the deck of the trailer 110 to raise and lower in an orderly fashion.

Figure 4:
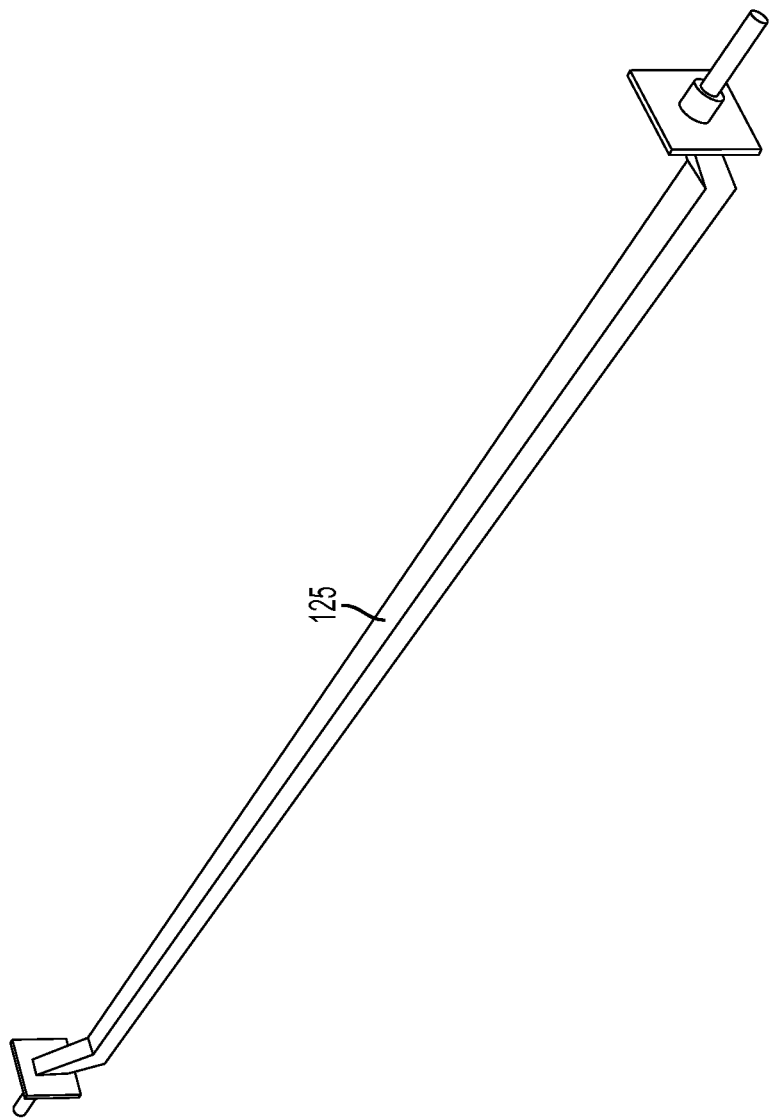
FIG. 4 is an illustration of a perspective of the drop axle according to an embodiment.

One of the reasons the trailer is capable of raising and lowering below the centerline of the wheels 115 is due to the use of a drop axle 125. FIG. 4 illustrates a drop axle125. The drop axle 125 is a substantially elongated "U" shaped device. The axle spans the width of the trailer 110, in the horizontal plane, at either end of the drop axle 125 are vertical wheel mounts 120. The vertical wheel mounts 120 arc designed to extend up to receive mounting points for the center of the trailer's wheels 115. In an exemplary embodiment, the center hubs 185 of the wheels 115 are spinning center hubs so that the drop axle 125 does not turn at all when mounted to wheels 115. The unique shape of the drop axle 125 is designed to allow the deck of the trailer 110 to be lowered below the centerline of the trailer's wheels 115. The deck of the trailer 110 can also be raised above the centerline of the trailer's wheels 115. In an embodiment, the trailer's wheels 115 are typical 12" to 25" diameter towing wheels depending on the trailer frame requirements. As explained above, in an exemplary embodiment, smaller diameter wheels are used to facilitate lowering the deck of the trailer 110 closer to ground.

In an embodiment, the modular dynamically height adjustable suspension system for towed trailers is designed to be added on to a utility trailer 110 as an after-market kit. In another embodiment, the suspension system may be built into a trailer system. In the embodiments described herein, the trailer 110 is a typical rectangular framed utility trailer. However, the trailer could also be a motorcycle, boat, horse, or any other utility trailer. The system could also be used with recreational vehicle trailers, storage trailers, food vendor trailers, etc.

While the present invention has been described in connection with the exemplary embodiments of the various figures, it is not limited thereto and it is to be understood that other similar embodiments may be used or modifications and additions may be made to the described embodiments for performing the same function of the present invention without deviating therefrom. Furthermore, it should be emphasized that a variety of trailer platforms, suspension components, axles and wheel systems are contemplated. Therefore, the present invention should not be limited to any single embodiment, but rather should be construed in breadth and scope in accordance with the appended claims. Also, the appended claims should be construed to include other variants and embodiments of the invention, which may be made by those skilled in the art without departing from the true spirit and scope of the present invention.

What is claimed:

1. A modular apparatus for raising and lowering the deck height of
    a trailer comprising:
        a trailer frame;
        two or more wheels each mounted to opposite ends of a drop axle via an air spring mounted between said trailer frame and said wheels,
        said air springs are connected via one or more compressed air lines to an air compressor connected to an air reservoir tank wherein when said air compressor pulls air to and from said air springs via the compressed air lines into and from the reservoir tank, such that the air springs collapse when the air is drawn out, thereby lowering said trailer frame below the center line of said wheels and the air spring inflate when filled, thereby raising said trailer frame above said centerline of said wheels,
        wherein said drop axle is further mounted to said trailer frame at each wheel via a squat bar, wherein one end of said squat bar is mounted to said drop axle at each wheel, and an opposite end of said squat bar is adjustably mounted to said trailer frame, and
        wherein each squat bar is further adjustably mounted via a shock absorber to dynamic height adjustable means.

2. The modular apparatus of claim 1, wherein one or more pan-hard bars are connected on one side of said trailer frame and traverses the width of said trailer frame to connect to a squat bar mounted on an opposite side of said trailer frame, wherein said pan-hard bar serves to locate and center the drop axle.

3. The modular apparatus of claim 2, wherein said pan-hard bar is adjustably attached to said trailer frame and/or said squat bar.

4. The modular apparatus of claim 1, wherein said drop axle comprises a substantially "U" shape such that the drop axle comprises a substantially horizontal portion at its center, with substantially vertical portions on its opposites ends, such that said vertical portions extend up to attached to center hubs of said wheels.

5. The modular apparatus of claim 1, wherein said wheels comprises a spinning center hub such that the drop axle does not turn at all when mounted to the wheels.

6. A system for raising and lowering the deck height of a trailer comprising:
    a trailer frame; and
    two or more wheels each mounted to opposite ends of a drop axle via a dynamic height adjustable means mounted between said trailer frame and said wheels; and such that said dynamic height adjustable means raises and lowers said trailer frame above and below the center line of said wheels to aid loading cargo onto said trailer frame,
    wherein said dynamic height adjustable means comprises air springs coupled to an electrically operable air compressor and an air reservoir tank such that said air compressor pulls air to and from said air springs via compressed air lines into and from the reservoir tank, such that the air springs collapse when the air is drawn out, thereby lowering said trailer frame below the center line of said wheels and the air spring inflate when filled, thereby raising said trailer frame above said center line of said wheels, wherein said drop axle is further mounted to said trailer frame at each wheel via a squat bar, wherein one end of said squat bar is mounted to said drop axle at each wheel, and an opposite end of said squat bar is adjustably mounted to said trailer frame, and wherein one or more pan-hard bars are connected on one side of said trailer frame and traverses the width of said trailer frame to connect said pan-hard bar to said squat bar mounted on an opposite side of said trailer frame using an adjustable attachment means, wherein said pan-hard bar serves to locate and center the drop axle.

7. The system of claim 6, wherein each of said squat bars are further adjustably mounted via shock absorbers to said dynamic height adjustable means.

8. The system of claim 7, wherein the dynamic height adjustable means, drop axle, squat bars, and shock absorbers are removably attachable to the trailer frame.

9. The system of claim 7, wherein the dynamic height adjustable means, drop axle, squat bar, and shock absorbers are fixably attached to the trailer frame.

10. The system of claim 6, wherein said pan-hard bar has an adjustable attachment means for attaching to said trailer frame and/or said squat bar.

11. The system of claim 6, wherein said drop axle comprises a substantially "U" shape such that the drop axle comprises a substantially horizontal portion at its center, with substantially vertical portions on its opposites ends, such that said vertical portions extend up to attached to center hubs of said wheels.

12. The system of claim 6, wherein said wheels comprises a spinning center hub such that the drop axle does not turn at all when mounted to the wheels.

13. The system of claim 6, wherein each of the dynamic height adjustable means are independently operable.

14. A system for raising and lowering the deck height of a trailer comprising:

a trailer frame; and two or more wheels each mounted to opposite ends of a drop axle via a dynamic height adjustable means mounted between said trailer frame and said wheels; and such that said dynamic height adjustable means raises and lowers said trailer frame above and below the center line of said wheels to aid loading cargo onto said trailer frame, wherein said drop axle is further mounted to said trailer frame at each wheel via a squat bar, wherein one end of said squat bars is mounted to said drop axle at each wheel, and an opposite end of said squat bar is adjustably mounted to said trailer frame, and wherein one or more pan-hard bars are connected on one side of said trailer frame and traverses the width of said trailer frame to connect said pan-hard bar to said squat bar mounted on an opposite side of said trailer frame using an adjustable attachment means, wherein said pan-hard bar serves to locate and center the drop axle.

15. The system of claim 14, wherein said dynamic height adjustable means comprises air springs coupled to an electrically operable air compressor and an air reservoir tank such that said air compressor pulls air to and from said air springs via compressed air lines into and from the reservoir tank, such that the air springs collapse when the air is drawn out, thereby lowering said trailer frame below the center line of said wheels and the air spring inflate when filled; thereby raising said trailer frame above said center line of said wheels.

16. The system of claim 14, wherein said dynamic height adjustable means comprises hydraulic springs coupled to an electrically operable hydraulic pump and an a hydraulic reservoir tank such that said hydraulic pump pulls hydraulic fluid to and from said hydraulic springs via hydraulic lines into and from the reservoir tank, such that the hydraulic springs collapse when the hydraulic fluid is drawn out, thereby lowering said trailer frame below the center line of said wheels and the hydraulic springs inflate when filled, thereby raising said trailer frame above said center line of said wheels.

17. The system of claim 14, wherein said dynamic height adjustable means comprises magnetically adjustable springs coupled to an electrical control system, wherein the magnetically adjustable springs dynamically damp forces between the wheels and the trailer frame and further allow the deck of the trailer frame to be raised or lowered.

18. The system of claim 14, wherein each of said squat bars are further adjustably mounted via shock absorbers to said dynamic height adjustable means.

* * * * *